US006760596B1

(12) United States Patent
Fiorini et al.

(10) Patent No.: US 6,760,596 B1
(45) Date of Patent: Jul. 6, 2004

(54) METHOD AND SYSTEM FOR BIT-RATE ADAPTATION TO IMPROVE COVERAGE

(75) Inventors: Andrea Fiorini, San Giorgio di Piano (IT); Magnus Karlsson, Solna (SE); Luca Vignali, Reggio Emilia (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 631 days.

(21) Appl. No.: 09/718,566

(22) Filed: Nov. 22, 2000

Related U.S. Application Data
(60) Provisional application No. 60/168,833, filed on Dec. 3, 1999.

(51) Int. Cl.[7] .................................................. H04B 7/00
(52) U.S. Cl. ....................... 455/522; 455/69; 455/67.11; 455/67.13
(58) Field of Search .............................. 455/522, 453, 455/67.11, 69, 67.13; 370/232, 468, 310.2, 311, 312, 327, 337; 375/297, 295

(56) References Cited

U.S. PATENT DOCUMENTS

| | | | | |
|---|---|---|---|---|
| 5,485,486 A | * | 1/1996 | Gilhousen et al. | 370/335 |
| 6,442,398 B1 | * | 8/2002 | Padovani et al. | 455/522 |
| 6,611,676 B2 | * | 8/2003 | Ue et al. | 455/69 |

OTHER PUBLICATIONS

Nokia TSG–RAN Working Group 4; "*Minimum Requirement For UE Radio Link Adaptation Function*"; Sep. 7 (?); Makuhari, Japan.
3 GPP; "*Technical Specification Group Radio Access Network; MAC Protocol Specification*"; 1999; vol. 3.5.0; pp. 1–39.
3 GPP; "*Technical Specification Group Radio Access Networks: UE Radio Transmission and Reception (FDD)*"; 1999; vol. 3.4.1; pp. 1–65.
Gerald Ostermayer et al.; *Scheduling Algorithms for both TDD and FDD Mode in UMTS*; (Abstract); 6 pages.
3GPP; "*Technical Specification; Group Radio Access Network, RRC Protocol Specification*"; (Release 1999); vol. 3.4.1.
Magnus Karlsson; *Hard Versus Soft Handover for Packet Transmissions in WCDMA*; 6 pages.
3GPP TS 25.302; vol. 3.4.0; (Mar. 2000); "*Third Generation Partnership Project; Technical Specification Group Radio Access Network; Services Provided by the Physical Layer*"; (Release 1999) pp. 2–55.
3GPP TS 25.401; vol. 3.4.0; (Sep. 2000); "*Third Generation Partnership Project; Technical Specification Group Radio Access Network; UTRAN Overall Description*"; (Release 1999); pp. 2–36.
3GPP TS 25.133; vol. 3.3.0; (Sep. 2000); "*Third Generation Partnership Project; Technical Specification Group Radio Access Networks; Requirements for Support of Radio Resource Management (FDD)*"; (Release 1999); pp. 2–92.
TSGW4#9(99)800; *Additional Requirements for UE Radio Link Adaption Function* (Dec. 1999); 3 Pages.
Erik Dahlman et al.; *WCDMA–The Radio Interface for Future Mobile Multimedia Communications*; IEEE Transactions on Vehicular Technology, vol. 47, No. 4, Nov. 1998; pp. 1105–1118.

(List continued on next page.)

Primary Examiner—Nay Maung
Assistant Examiner—Alan T. Gantt (57) ABSTRACT

A mobile station decreases its transmit bit rate in response to a determination that its transmit power has exceeded an alarm-power threshold. The mobile station increases its bit rate in response to a determination that its transmit power is below a lower-power threshold. Lower-power threshold and alarm-power threshold delays can be employed to prevent ping-pong effects and avoid unnecessary throughput degradation. A dynamic lower-power threshold can be employed in which the mobile station estimates or predicts its transmit power if it were to increase its transmit bit rate and increases its transmit bit rate only if this can be performed without exceeding the alarm-power threshold.

31 Claims, 5 Drawing Sheets

OTHER PUBLICATIONS

3GPP TS 25.211 V3.0.0 (Oct. 1999); *"Third Generation Partnership Project; Technical Specification Group Access Network; Physical Channels and Mapping of Transport Channels Onto Physical Channels (FDD)"*; pp. 2–35.

3GPP TS 25.133 V3.0.0 (Dec. 1999); *"Third Generation Partnership Project (3GPP); Technical Specification Group (TSG) RAN WG4; Requirements for Support of Radio Resource Management (FDD)"*; pp. 2–34.

Riccardo De Bernardi et al.; *Load Control Strategies for Mixed Services in WCDMA*; 5 Pages.

Jens Knutsson et al.; *Evaluation of Admission Control Algorithms for CDMA System in a Manhattan Environment*; Dept. of Electrical and Computer Engineering, Wireless Information Networks Laboratory; Rutgers University, P.O. Box 909, Piscataway New Jersey 08855–0909; Proceedings of Second CDMA International Conference, Oct. 1997; pp. 414–418.

B. Christer V. Johannson; *Packet Data Capacity in a Wideband CDMA System*; (Nov. 28, 1997); 6 Pages.

* cited by examiner

METHOD AND SYSTEM FOR BIT-RATE ADAPTATION TO IMPROVE COVERAGE

RELATED APPLICATIONS

This application claims priority from, and incorporates herein by reference, the entire disclosure of U.S. Provisional Application No. 60/168,833, filed Dec. 3, 1999, entitled Rate Adaptation to Improve Coverage.

BACKGROUND

1. Technical Field of the Invention

The present invention generally relates to wireless communication networks. In particular, it relates to a method and system for mobile-station-uplink-transmit bit-rate adaptation to extend coverage area of a cell and to reduce a required uplink carrier signal/interference signal (C/I) level.

2. Description of Background and Related Art

Network operators estimate that in the near future there will be more than 1 billion mobile phone subscribers worldwide. By then, the number of wireless phones may equal or even exceed the number of wired phones. It is clear that the next significant development in wireless communications involves the standardization of third-generation wireless services. Third-generation wireless services will enable subscribers to, for example, make video calls to friends and colleagues from the mobile station, while simultaneously accessing a remote database from that same mobile station, or receiving e-mails and phone calls.

One possible platform or standard for third-generation wireless services is known as Wideband Code Division Multiple Access (WCDMA). The WCDMA standard supports both packet-switched and circuit switched communications such as Internet browsing and traditional landline telephone services, respectively. The WCDMA Standard has been submitted to the International Telecommunication Union (ITU). The ITU is the body that selects the platforms or standards that are to support the third-generation services to be used in what is known as a universal mobile telecommunications system (UMTS).

In WCDMA networks, a closed loop power control (PC) operates on both an uplink and a downlink of a network and is responsible for maintaining required link quality. The PC decreases or increases transmit power to keep a carrier-signal-to-interference-signal level (C/I) measured at a receiving side as close as possible to a required C/I level so that acceptable link quality is maintained. The required C/I level is set by the network in order to attempt to maintain acceptable link quality, which is defined in terms of frame error rate (FER) for speech and block error rate (BLER) for packet data transmissions. The higher the C/I, the lower the FER and BLER.

When a mobile station operating within a cell served by a base station approaches a border of the cell, the uplink power control attempts to maintain the uplink quality by increasing the transmit power of the mobile station. The increase in transmit power by the mobile station continues until the transmit power of the mobile station reaches a maximal value beyond which the mobile station cannot further increase its transmit power. Once the mobile station is transmitting at maximal power, it can no longer respond to further degradation of the uplink C/I by increasing its transmit power more. Therefore, if the maximal mobile station transmit power has already been reached, the mobile station is unable to further increase its power to adapt to increased FER and/or BLER resulting from the degraded C/I.

Uplink quality degradation is especially strong if a cell breathing effect of the network is stressed by a large number of high-bit-rate-data-capable mobile stations being served by the network. Cell breathing refers to coverage fluctuations of the cell due to increased traffic. High connection reliability is often needed for packet-data services requested by the high-bit-rate-data-capable mobile stations; therefore, applications that use high-bit-rate packet-data services can usually tolerate only very low error rates. An Automatic Repeat reQuest (ARQ) protocol can handle errors by retransmitting packets received in error. However, because the C/I degrades as the high-bit-rate-capable mobile stations using the packet-data services move closer to the cell border, the ARQ orders more and more retransmissions of packets received in error. As a result of the retransmissions, these high bit-rate data capable mobile stations do not get adequate throughput. Therefore, these mobile stations typically achieve an acceptable uplink quality only when they are close enough to the base station that the required C/I level is present.

It is well known that decreasing an uplink mobile station transmit bit-rate by increasing a spreading factor decreases the C/I level required to ensure a desired FER or BLER. The lower required C/I level at a lower bit rate can be fulfilled with less mobile station transmit power, with the result being that the uplink quality and coverage of the cell improve. Decreasing the uplink transmit bit rate is particularly well-suited for packet-data transmission schemes in which a set of transport format combinations is assigned to each of the mobile stations, as in WCDMA. Each transport format combination set delineates transmit bit-rates available to certain mobile stations. Thus, under WCDMA, when a given mobile station decreases its transmit bit rate, it is adapting to a transport format combination that corresponds to a lower bit rate within the transport format combination set (TFCS) assigned to the given mobile station.

A mobile-station-managed-bit-rate-reduction-based approach to improving the coverage area of a cell is described in *Minimum Requirement for UE radio link adaptation function,* TSG-RAN Working Group 4 (Radio) meeting #7, TSGW#7(99)492, Source: Nokia (hereinafter "the Nokia paper"). The Nokia paper describes a mobile-station-managed bit-rate decrease based on a power-alarm threshold and averaging time requirements. The approach described in the Nokia paper requires that when maximum transmit power of a mobile station has been reached and the closed-loop power control can no longer be maintained, the mobile station (also referred to as user equipment, or UE) lowers its transmit bit-rate within a specified maximal time period to the next lower bit rate within its assigned transport format combination set. The Nokia paper's approach has been approved as a minimum requirement for user equipment radio link adaptation function for a Third Generation Partnership Project (3GPP) technical specification entitled *Requirements for Support of Radio Resource Management,* (FDD) TDS 25.133 v. 2.2.0. Network-managed-bit-rate-reduction-based approaches are also possible in which, for example, a radio network controller (RNC) orders a bit-rate reduction responsive to receipt of a power-alarm trigger from the mobile station.

A mobile-station-handled approach would most likely be better suited for solving local coverage-area problems than a network-handled approach because it would avoid delays in information exchange between the network (e.g., the RNC) and the mobile stations. This is because a network-handled approach is by its very nature more centralized that a mobile-station handled approach and therefore would almost certainly react more slowly to C/I degradation due to, for example, extra delays occasioned by information being exchanged between the network and the mobile station.

While the Nokia paper teaches a mobile-station-handled approach and therefore arguably avoids the information-exchange-delay drawback of network-handled approaches, the Nokia paper does not provide for mobile-station transmit bit-rate increases responsive to subsequent improvements in C/I. This failure is due to concerns about network instability that can result from rapid oscillations between higher and lower uplink-transmit bit-rates, which are sometimes referred to as ping-pong effects. If, in order to avoid ping-pong effects, a bit-rate-increase functionality is not included, unnecessarily-low throughput occurs after the C/I improves. This is especially true in best-effort services in which the highest possible bit-rate has been requested by mobile stations.

In order to extend a coverage area of the cell and decrease a required C/I level, a method and system are needed that permit a closed loop power control (PC) to quickly respond to C/I degradation and to maintain link quality as the distance of the mobile station from the base station increases. This need is especially strongly felt when the network is heavily loaded with the high-bit-rate-data-capable mobile stations that stress the breathing effect of the cell. In the event that the uplink-transmit bit rate of the mobile stations has been decreased and the C/I subsequently improves, it would be desirable for the uplink-transmit bit rate of the mobile stations to be increased in response thereto. However, the variable uplink-transmit bit-rate functionality should not result in ping-pong effects.

SUMMARY OF THE INVENTION

These and other drawbacks are overcome by the present invention. A method of transmitting at various bit rates to improve coverage of a cell comprises the steps of transmitting by a mobile station at a first bit rate, transmitting by the mobile station at a second bit rate responsive to a determination that a transmit power of the mobile station exceeds an alarm-power threshold, and transmitting by the mobile station at a third bit rate. The transmission by the mobile station at the third bit rate is responsive to a determination that the transmit power of the mobile station has not exceeded a lower-power threshold for a predetermined time period. The lower-power threshold can be set so that the step of transmitting by the mobile station at the third bit rate does not cause the transmit power of the mobile station to exceed the alarm-power threshold.

A bit rate adaptation system in accordance with the present invention comprises a mobile station and a network serving the mobile station. The mobile station transmits at a first bit rate until a transmit power of the mobile station exceeds an alarm-power threshold, transmitting at a second bit rate responsive to the transmit power exceeding the alarm-power threshold, and transmitting at a third bit rate responsive to the transmit power being less than a lower-power threshold for a predetermined time period. The lower-power threshold can be set by the mobile station at the third bit rate so that a bit-rate increase does not cause the transmit power of the mobile station to exceed the alarm-power threshold.

A method of transmitting at various bit rates to improve coverage area of a cell comprises the steps of transmitting by a mobile station at a first bit rate, transmitting by the mobile station of the second bit rate, estimating a transmit power corresponding to transmission by the mobile station at a third bit rate, and transmitting by the mobile station at the third bit rate. The step of transmitting by the mobile station at the second bit rate is responsive to a determination that the transmit power of the mobile station has exceeded an alarm-power threshold for a predetermined time period. The step of transmitting by the mobile station at the third bit rate is responsive to a determination that the estimated transmit power would not exceed the alarm-power threshold.

A bit rate adaptation system in accordance with the present invention comprises a mobile station and a network serving the mobile station. The mobile station transmits at a first bit rate until a transmit power of the mobile station exceeds an alarm-power threshold for a predetermined time period, transmits at a second bit rate responsive to the transmit power exceeding the alarm-power threshold for the predetermined time period, and transmits at a third bit rate responsive to a determination by the mobile station that the transmit power corresponding to the third bit rate would not exceed the alarm-power threshold.

BRIEF DESCRIPTION OF THE DRAWINGS

A more complete understanding of the method and system of the present invention may be had by reference to the following Detailed Description when taken in conjunction with the accompanying drawings, wherein.

DETAILED DESCRIPTION

Figure 1:
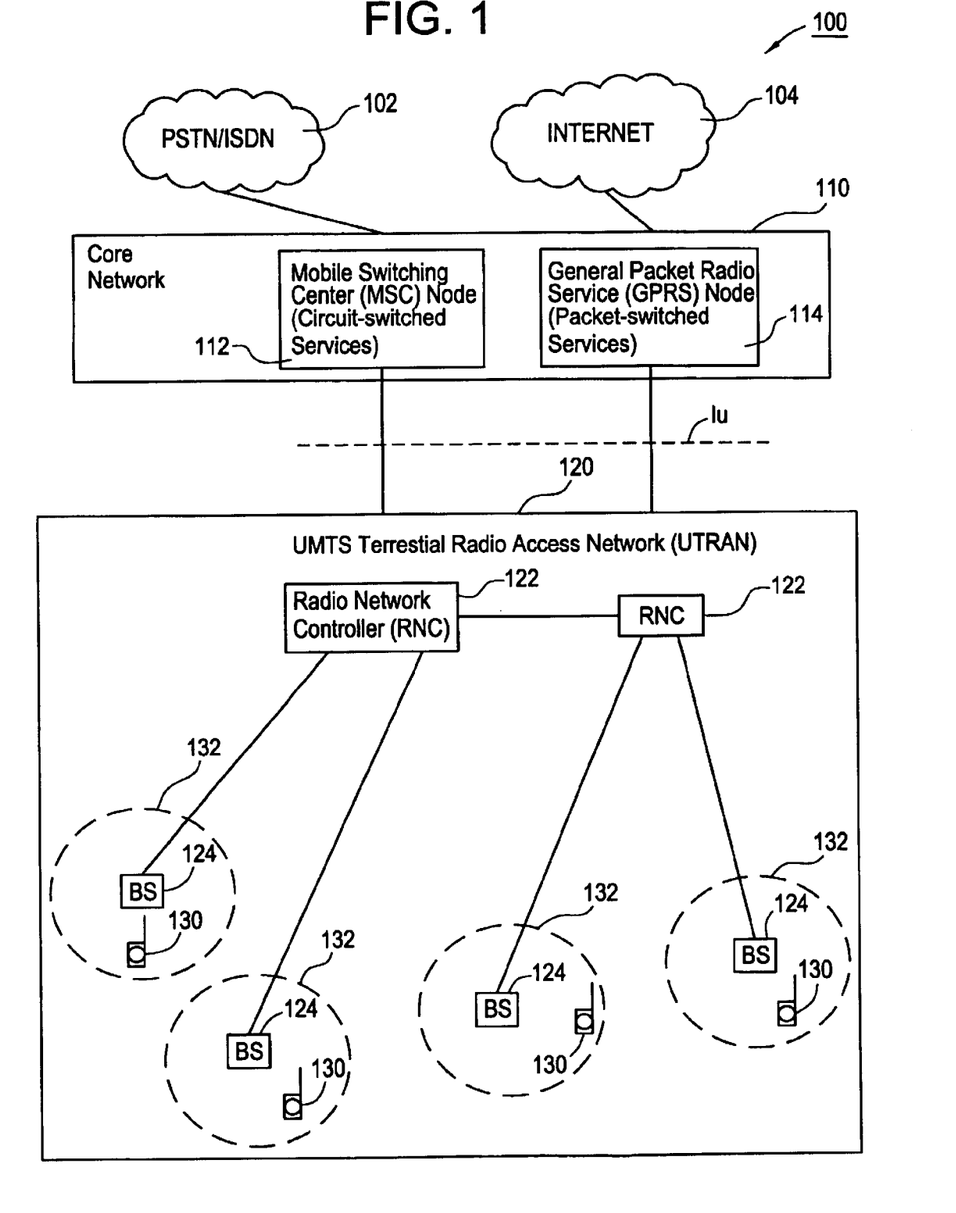
FIG. 1 is a block diagram illustrating basic components of an exemplary communications network in accordance with the present invention.

Reference is now made to FIG. 1, wherein there is shown a block diagram illustrating the basic components of an exemplary communications network 100 in accordance with the present invention. Although the communications network 100 will be described with reference to a universal mobile telecommunications system (UMTS) and the WCDMA standard, it should be understood that the present invention can be used with any communications network that allows a mobile station to transmit at various bit rates. Accordingly, the communications network 100 should not be construed in a limited manner.

Referring again to FIG. 1, there is shown a block diagram illustrating basic components of the communications network 100. Certain details associated with the communications network 100 are known in the industry and as such need not be described herein. Therefore, for clarity, the description provided below in relation to the communications network 100 omits some components not necessary to understand the invention.

The communications network 100 described in the context of the universal mobile telecommunications system (UMTS) can include a representative, connection-oriented, external core network, shown as a cloud 102 (e.g., the Public Switched Telephone Network (PSTN) and/or the Integrated Services Digital Network (ISDN)). A representative, connectionless-oriented, external core network, shown as a cloud 104, can be, for example, the Internet. Both of the core networks 102 and 104 are coupled to corresponding service nodes of a core network 110. The PSTN/ISDN connection-oriented network 102 is connected to a connection-oriented service node shown as a mobile switching center (MSC) node 112 of the core network 110, which provides circuit-switched services. The Internet connectionless-oriented network 104 is connected to a General Packet Radio Service (GPRS) node 114 of the core network 110 and is adapted to provide packet-data services.

Each of the nodes 112 and 114 connects to a UMTS Terrestrial Radio Access Network (UTRAN) 120 over a UTRAN interface ($I_u$). The UTRAN 120 includes one or more radio network controllers (RNCs) 122. Each RNC 122 is connected to a plurality of base stations (BS) 124 and to any other RNCs in the UTRAN 120. Radio communications between the base stations 124 and mobile stations (MS) 130 are by way of a radio interface, approximate coverage areas of the base stations 124 being illustrated by cells 132. Radio access is based on the wideband code-division-multiple-access (WCDMA) standard with individual radio channels allocated using WCDMA spreading codes.

WCDMA provides wide bandwidth for multimedia services and other high-rate demands as well as robust features like diversity handoff to ensure high quality. WCDMA is able to support many different services used at the same time by one of the mobile stations 130. The different services include, for example, data, speech, Internet, intranet, fax, video streaming, video conferencing, electronic commerce, remote control, remote monitoring, interactive e-mail, messaging, and certain types of entertainment, each of which usually has a different degree of quality or protection when compared to other types of services. The mobile stations 130 are capable of transmitting at different bit rates as needed in accessing the different services.

Figure 2:
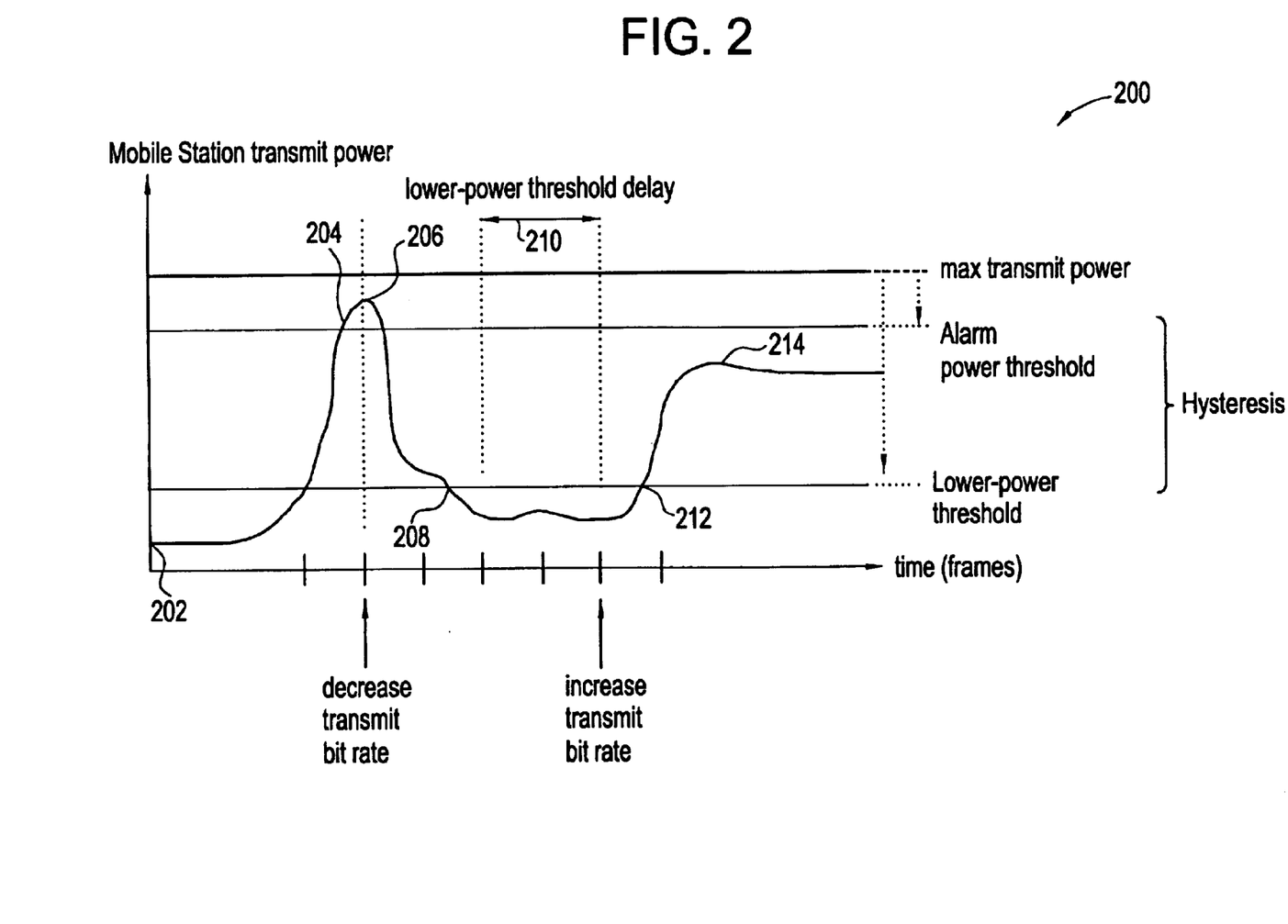
FIG. 2 is a graph illustrating an exemplary mobile-station transmit bit-rate adaptation responsive to mobile-station transmit power as a function of time in accordance with a first embodiment of the present invention.

Reference is now made to FIG. 2, wherein there is shown a graph illustrating an exemplary mobile-station transmit bit-rate adaptation responsive to mobile-station transmit power as a function of time in accordance with a first embodiment of the present invention. In order to cope with uplink C/I degradation that can result from an inability of the mobile stations 130 to increase transmit power above a given maximal value, a mobile-station-transmit bit rate is decreased. This decrease in the mobile-station-transmit bit rate increases processing gain of communications between the mobile stations 130 and the base stations 124 serving the mobile stations 130. Decreasing the uplink-transmit bit rate reduces a required carrier signal / interference signal (C/I) level and allows a closed loop power control (PC) to better fulfill uplink quality requirements. The mobile-station uplink-transmit bit-rate adaptations are made by the mobile stations 130 determining, without network 100 involvement, when to increase or decrease their uplink-transmit bit rate. The present invention allows the mobile stations 130 to avoid unnecessarily transmitting at maximal power.

On a frame basis (e.g., 10 ms), the mobile station 130 compares a transmit power of the mobile station 130 to two different thresholds (i.e., a hysteresis), the two thresholds serving to minimize ping-pong effects between different uplink-transmit bit rates. The two different thresholds are an alarm-power threshold and a lower-power threshold. The mobile station 130 decreases or increases its uplink-transmit bit rates to the next lesser or greater bit rate within a transport format combination set assigned to the mobile station 130 responsive to the transmit power of the mobile station 130 being above the alarm-power threshold or below the lower-power threshold, respectively.

The lower-power threshold is preferably set at a point that minimizes ping-pong effects. A first mechanism for setting the lower-power threshold is to set the lower-power threshold at the same value for all bit rates within the same transport format combination set (TFCS) for each of the mobile stations 130. The first mechanism is a network-configured link adaptation in which the network can set link-adaptation parameters globally rather then setting a lower-power threshold for each mobile station. When a mobile station 130 receives a TFCS from the network, a parameter setting for bit-rate adaptation (including a lower-power threshold value) can be included as well.

Referring again to FIG. 2, graph 200 shows mobile station transmit power as a function of time. Beginning at time 202, transmit power of the mobile station 130 is below the alarm-power threshold. As the mobile station 130 moves toward a boundary of the cell 132 in which the mobile station 130 is operating, the mobile station 130 increases its transmit power in order to maintain a required C/I level. The mobile station 130 continues to increase its transmit power until the transmit power exceeds the alarm-power threshold, as shown at time 204. Once the transmit power of the mobile station 130 exceeds the alarm-power threshold, the mobile station 130 decreases its bit-rate immediately (i.e., at the next frame the mobile station 130 drops to a lower bit-rate), as shown beginning at time 206. Once the mobile station 130 has decreased its transmit bit rate beginning at time 206, the mobile station decreases its transmit power, since it is no longer necessary for the mobile station 130 to transmit at such a high power in order for the mobile station 130 to attempt to maintain the required C/I level.

From time 206, the transmit power of the mobile station 130 decreases until it falls below the lower-power threshold at time 208. The mobile station 130 does not return to a higher bit rate until the transmit power of the mobile station 130 has remained below the lower-power threshold for a predetermined time period, which is referred to as a lower-power threshold delay 210. The lower-power threshold delay 210 serves to provide uplink interference stability and avoid ping-pong effects due to, for example, favorable fading and/or traffic load variations. The lower-power threshold delay 210 can be set at any desirable level, including zero. While in some cases ping-pong effects can be adequately dealt with using only the hysteresis formed by the alarm-power and lower-power thresholds, it is preferable that the lower-power threshold delay 210 not be set to zero so that ping-pong effects can be further minimized or avoided altogether.

From approximately time 208 to time 212, the lower-power threshold delay 210 expires. After the lower-power threshold delay 210 has expired, the mobile station 130 increases its transmit bit rate, which requires the mobile station 130 to increase its transmit power in order to achieve a required C/I level of the higher bit rate to which the mobile station 130 has just switched. Beginning at time 214, the mobile station 130 maintains its transmit bit rate at the level switched-to beginning at time 212 and its transmit power stabilizes.

It can thus be seen from FIG. 2 that the mobile station immediately decreases its transmit bit rate in response to the alarm-power threshold being exceeded. The mobile station also increases its transmit bit rate in response to its transmit power being below the lower-power threshold for the lower-power threshold delay. The lower-power threshold delay serves to provide uplink interference stability, which minimizes ping-pong effects due to, for example, favorable fading.

Figure 3:
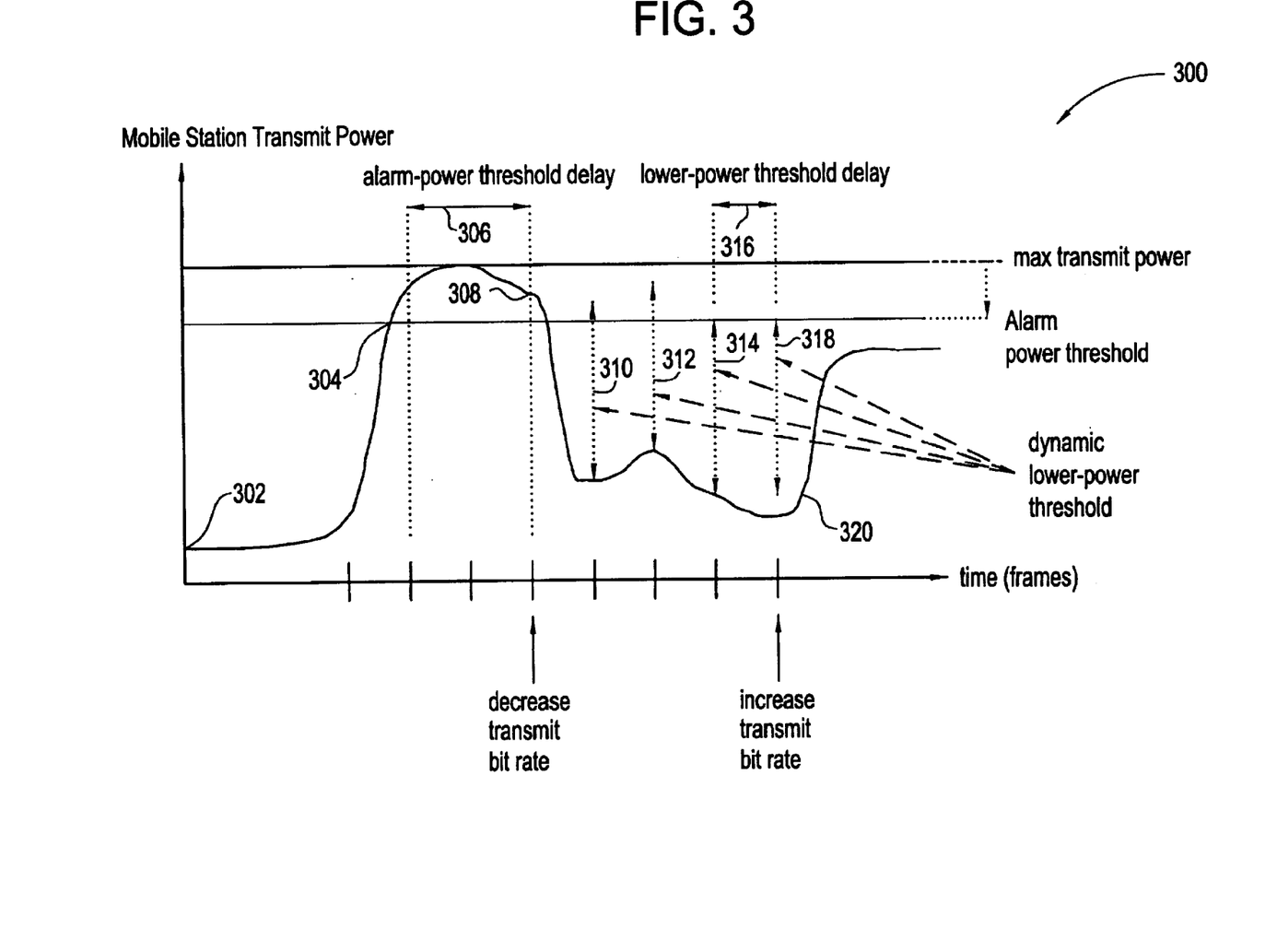
FIG. 3 is a graph illustrating an exemplary mobile-station transmit bit-rate adaptation responsive to mobile-station transmit power as a function of time in accordance with a second embodiment of the present invention.

Reference is now made to FIG. 3, wherein is shown a graph illustrating exemplary mobile-station transmit bit-rate adaptation responsive to mobile-station transmit power as a function of time in accordance with a second embodiment of the present invention. In order to cope with uplink C/I degradation that can result from an inability of the mobile stations 130 to increase transmit power above a given maximal value, a mobile-station-transmit bit rate is decreased. This decrease in the mobile-station-transmit bit rate increases processing gain of communications between the mobile stations 130 and the base stations 124 serving the mobile stations 130. Decreasing the uplink-transmit bit rate reduces a required carrier signal/interference signal (C/I) level and allows a closed loop power control (PC) to better fulfill uplink quality requirements. The mobile-station uplink-transmit bit-rate adaptations are made by the mobile stations 130 determining, without network 100 involvement, when to increase or decrease its uplink-transmit bit rate. The present invention allows the mobile station 130 to avoid unnecessarily transmitting at maximal power.

On a frame basis (e.g., 10 ms), the mobile station 130 compares a transmit power of the mobile station 130 to two different thresholds (i.e., a hysteresis), the two thresholds serving to minimize ping-pong effects between different uplink-transmit bit rates. The two different thresholds are an alarm-power threshold and a dynamic lower-power threshold. The mobile station 130 decreases or increases its uplink-transmit bit rates to the next lesser or greater bit rate within a transport format combination set assigned to the mobile station 130 responsive to the transmit power of the mobile station 130 being above the alarm-power threshold or below the lower-power threshold, respectively.

The dynamic lower-power threshold is preferably set at a point that minimizes ping-pong effects. In contrast to the first mechanism discussed in relation to FIG. 2, a second mechanism for setting the lower-power threshold is to set a different lower-power threshold for each pair of transport format combinations corresponding to adjacent mobile-station bit rates. Under the second mechanism, the dynamic lower-power thresholds are set so that the transmit power needed for an increase of the mobile-station uplink-transmit bit-rate does not exceed the alarm-power threshold. In other words, the mobile stations 130 predict what the transmit power will be after the mobile-station transmit bit-rate increase and increase the bit rate only if the increase will not cause the alarm-power threshold to be exceeded. This prediction is preferably made based on the current transmit power and on an assumption that uplink interference and path gain will stay constant.

Referring again to FIG. 3, a graph 300 shows mobile station transmit power as a function of time. Beginning at time 302, transmit power of the mobile station 130 is below the alarm-power threshold. As the mobile station 130 moves toward a boundary of a the cell 132 in which the mobile station 130 is operating, the mobile station 130 increases its transmit power in order to maintain a required C/I level. The mobile station 130 continues to increase its transmit power until the transmit power exceeds the alarm-power threshold, as shown at time 304. Once the transmit power of the mobile station 130 exceeds the alarm-power threshold, the mobile station 130 does not adapt to a lower bit rate until the transmit power of the mobile station 130 has exceeded the alarm-power threshold for a predetermined time period, which is referred to as an alarm-power threshold delay 306. The alarm-power threshold delay 306 can be set to any desired level, including zero. The alarm-power threshold delay 306 helps to avoid throughput degradation due to, for example, unnecessary bit-rate reductions resulting from momentary increases in interference levels due to, for example, unfavorable fading variations. However, it is preferable that the alarm-power threshold delay 306 not be set to zero so that its throughput benefits can be gained. (Although no alarm-power threshold delay 306 is shown in FIG. 2, it will be apparent to those skilled in the art that an alarm-power threshold delay 306 could be used in the bit-rate adaption of FIG. 2.)

Following expiration of the alarm-power threshold delay 306 at time 308, the mobile station 130 decreases its bit-rate. Once the mobile station 130 has decreased its transmit bit rate beginning at time 308, the mobile station decreases its transmit power, since it is no longer necessary for the mobile station 130 to transmit at such a high power in order for the mobile station 130 to attempt to maintain the C/I level required for the previous, higher, bit rate.

From time 308, the transmit power of the mobile station 130 decreases to a level that is sufficient to permit the mobile station 130 to transmit at the bit rate switched to at time 308 and maintain a required C/I level for that bit rate. At time 310, the mobile station 130 estimates what its transmit power will be if the mobile station 130 increases its transmit power to the next higher bit rate, and then compares that estimated-transmit-power to the alarm-power threshold. The mobile station 130 determines that an increase to the next-higher transmit bit rate would cause the transmit power of the mobile station 130 to exceed the alarm-power threshold, so the mobile station 312 does not increase its transmit bit rate. At time 312, the process performed at time 310 is repeated. At time 312, the same result of time 310 is reached, such that the mobile station 130 does not increase its transmit bit rate.

At time 314, the process of time 310 is repeated and the mobile station 130 determines that the mobile station 130 can increase its transmit power to the next higher transmit bit rate without exceeding the alarm-power threshold. Following this determination by the mobile station 130 that the mobile station 130 can increase its transmit bit rate to the next higher bit rate without exceeding the alarm-power threshold, a lower-power threshold delay 316 begins running. The lower-power threshold delay 316 can be set at any value, including zero. While in some cases ping-pong effects can be adequately dealt with using only the hysteresis formed by the alarm-power and lower-power thresholds, it is preferable that the lower-power threshold delay 316 not be set to zero so that ping-pong effects can be minimized. Upon expiration of the lower-power threshold delay 316, at time 318 the mobile station 130 again repeats the process of time 310, and, because the transmit bit rate can be increased to the next-higher bit rate without the alarm-power threshold being exceeded, the mobile station 130 increases its transmit bit rate accordingly, as shown beginning at time 320.

It can thus be seen from FIG. 3 that the mobile station decreases its transmit bit rate in response to its transmit power being above the alarm-power threshold for the alarm-power threshold delay. The alarm-power threshold delay serves to prevent the mobile station from decreases its bit rate too quickly and therefore helps to avoid unnecessary degradation in throughput. The mobile station also employs a dynamic lower-power threshold, by which the mobile station predicts whether an increase in its transmit bit rate to the next higher bit rate would cause its transmit power to exceed the alarm-power threshold. If the mobile stations transmit power is at such a level for the lower-power threshold delay, the mobile station increases its transmit bit rate. The lower-power threshold delay serves to minimize or eliminate altogether ping-pong effects.

Figure 4:
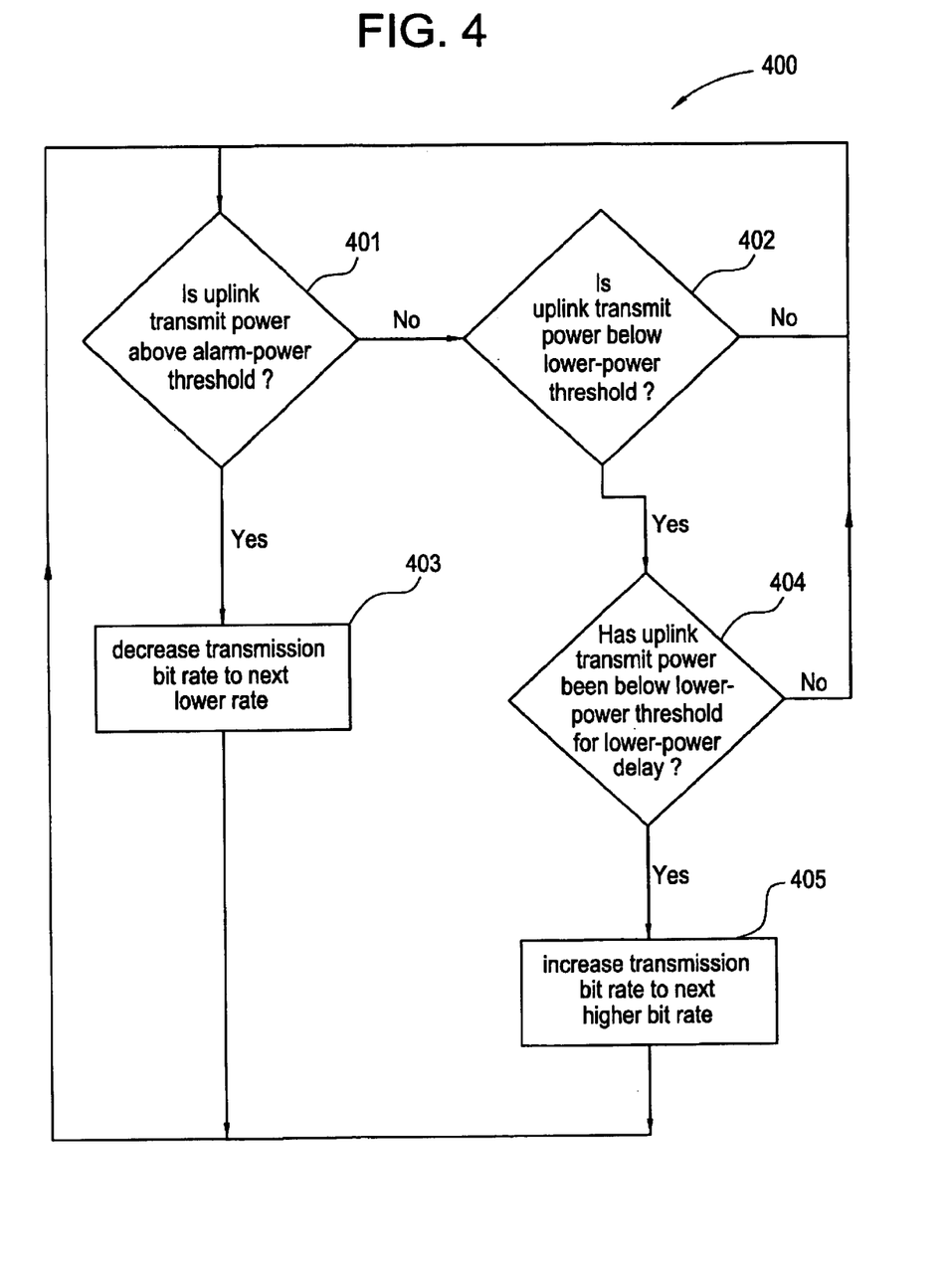
FIG. 4 is a flow chart illustrating a mobile-station uplink-transmit bit-rate adaptation algorithm in accordance with a first embodiment of the present invention.

Reference is now made to FIG. 4, wherein is shown a flow chart illustrating a mobile-station uplink-transmit bit-rate adaptation algorithm in accordance with a first of the present invention. A process 400 begins at step 401, wherein a determination is made whether the transmit power of the mobile station 130 is above the alarm-power threshold. If at step 401 it is not so determined, execution proceeds to step 402, wherein a determination is made whether the transmit power of the mobile station 130 is below a lower-power threshold. If it is not so determined, execution returns to step 401. If, at step 401, it is determined that the transmit power of the mobile station 130 is above the alarm-power threshold, execution proceeds to step 403. At step 403, an uplink-transmit bit rate of the mobile station 130 is decreased to a next lower bit rate within a transport format combination set of the mobile station 130. From step 403, execution returns to step 401.

If, at step 402, it is determined that the transmit power of the mobile station 130 is below the lower-power threshold, execution proceeds to step 404. At step 404, a determination is made whether the transmit power of the mobile station 130 has been below the lower-power threshold for the lower-power threshold delay. If it is not determined at step 404 that the transmit power of the mobile station 130 has been below the lower-power threshold for the lower-power threshold delay, execution returns to step 401. If, at step 404, it is determined that the transmit power of the mobile station 130 has been below the lower-power threshold for the lower-power threshold delay, execution proceeds to step 405.

At step 405, the uplink-transmit bit rate of the mobile station 130 is increased to a next higher bit rate in the transport format combination set of the mobile station 130. From step 405, execution returns to step 401.

It can thus be seen from FIG. 4 that the mobile station 130 decreases its uplink transmit bit rate responsive to its transmit power exceeding the alarm-power threshold. Decreasing the uplink-transmit bit rate of the mobile station 130 decreases the required carrier signal/interference signal (C/I) level and improves uplink quality. The mobile station 130 does not increase its uplink-transmit bit rate until it has been determined that its transmit power has been below the lower-power threshold for the lower-power threshold delay. The lower-power threshold delay prevents ping-pong effects between bit rates from occurring.

Figure 5:
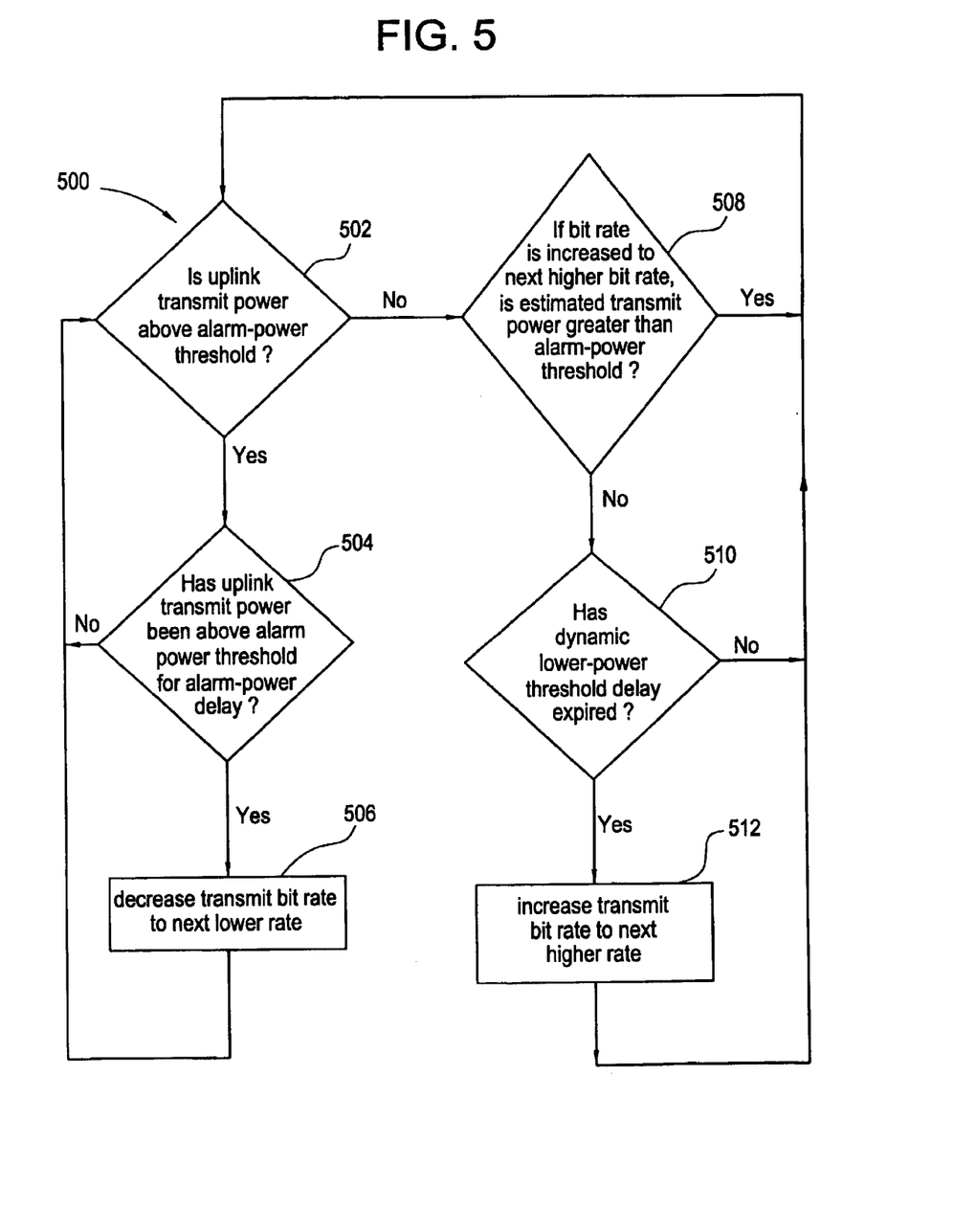
FIG. 5 is a flow chart illustrating a mobile-station uplink-transmit bit-rate adaptation algorithm in accordance with a second embodiment of the present invention.

Reference is now made to FIG. 5, wherein is shown a flow chart illustrating a mobile-station uplink-transmit bit-rate adaptation algorithm in accordance with a second embodiment of the present invention. The process 500 begins at step 502, wherein a determination is made whether the transmit power of the mobile station 130 is above the alarm-power threshold. If at step 502 it is so determined, execution proceeds to step 504, wherein a determination is made whether the transmit power of the mobile station has been above the alarm-power threshold for the alarm-power threshold delay. If it is so determined at step 504, execution proceeds to step 506. If it is not so determined at step 504, execution moves to step 502. At step 506, the transmit bit rate of the mobile station 130 is decreased to the next lower bit rate. From step 506, execution moves to step 502.

If, at step 502, it is not determined that the transmit power of the mobile station 130 is above the alarm-power threshold, execution proceeds to step 508. At step 508, a determination is made whether, if the transmit bit rate of the mobile station 130 were to be increased to the next higher bit rate, the estimated transmit power of the mobile station 130 would be greater than the alarm-power threshold. If, at step 508, it is not so determined, execution proceeds to step 510.

At step 510, a determination is made whether the dynamic lower-power threshold delay has expired. If ti is so determined at step 510, execution proceeds to step 512. At step 512, the transmit bit rate of the mobile station 130 is increased to the next higher bit rate. From step 512, execution moves to step 502.

If, at step 508, it is determined that if the transmit bit rate of the mobile station 130 were to be increased to the next higher bit rate, the estimated transmit power of the mobile station 130 would be greater than the alarm-power threshold, execution moves to step 502. If, at step 510, it is determined that the lower-power threshold delay has not expired, execution moves to step 502.

It can thus be seen from FIG. 5 that the mobile station 130 decreases its uplink transmit bit rate in response to its transmit power exceeding the alarm-power threshold for the alarm-power threshold delay. Decreasing the uplink transmit bit rate of the mobile station 130 decreases the required carrier signal/interference signal (C/I) level and improves uplink quality. The mobile station 130 does not increase its uplink transmit bit rate until it has determined that its transmit power has been sufficiently low to permit it to increase to the next higher bit rate without exceeding the alarm-power threshold for the dynamic lower-power threshold delay. The dynamic lower-power threshold delay prevents ping-pong effects between bit rates from occurring. In addition, the alarm-power threshold delay helps to prevent the mobile station from unnecessarily transmitting at a lower bit rate, which could cause throughput degradation.

Although preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions, such as, for example, various combinations of alarm-power and lower-power thresholds and alarm-power and lower-power threshold delays, without departing from the spirit of the invention as set forth and defined by the following claims.

What is claimed is:

1. A method of transmitting at various bit rates to improve coverage area of a cell, comprising the steps of:
   transmitting by a mobile station at a first bit rate;
   transmitting by the mobile station at a second bit rate responsive to a determination that a transmit power of the mobile station exceeds an alarm-power threshold; and
   transmitting by the mobile station at a third bit rate responsive to a determination that the transmit power of the mobile station has not exceeded a lower-power threshold for a predetermined time period wherein the first bit rate and the second bit rate belong to the same transport format combination set.

2. The method of claim 1 wherein the first bit rate exceeds the second bit rate.

3. The method of claim 1 wherein the third bit rate exceeds the second bit rate.

4. The method of claim 1 wherein the first bit rate and the third bit rate are identical.

5. A method of transmitting at various bit rates to improve coverage area of a cell, comprising the steps of:

transmitting by a mobile station at a first bit rate;

transmitting by the mobile station at a second bit rate responsive to a determination that a transmit power of the mobile station exceeds an alarm-power threshold; and transmitting by the mobile station at a third bit rate responsive to a determination that the transmit power of the mobile station has not exceeded a lower-power threshold for a predetermined time period wherein the second bit rate and the third bit rate belong to the same transport format combination set.

6. A method of transmitting at various bit rates to improve coverage area of a cell, comprising the steps of:

transmitting by a mobile station at a first bit rate;

transmitting by the mobile station at a second bit rate responsive to a determination that a transmit power of the mobile station exceeds an alarm-power threshold; and transmitting by the mobile station at a third bit rate responsive to a determination that the transmit power of the mobile station has not exceeded a lower-power threshold for a predetermined time period wherein the lower-power threshold is configured by a network serving the mobile station.

7. A method of transmitting at various bit rates to improve coverage area of a cell, comprising the steps of:

transmitting by a mobile station at a first bit rate;

transmitting by the mobile station at a second bit rate responsive to a determination that a transmit power of the mobile station exceeds an alarm-power threshold; and transmitting by the mobile station at a third bit rate responsive to a determination that the transmit power of the mobile station has not exceeded a lower-power threshold for a predetermined time period further comprising the step of setting the lower-power threshold at a same value within a given transport format combination set.

8. The method of claim 7 further comprising the step of setting the lower-power threshold of the mobile station based on the second bit rate and the third bit rate.

9. The method of claim 7 further comprising the step of setting the lower-power threshold so that the step of transmitting by the mobile station at the third bit rate does not cause the transmit power of the mobile station to exceed the alarm-power threshold.

10. A bit-rate adaptation system comprising:

a mobile station transmitting at a first bit rate until a transmit power of the mobile station exceeds an alarm-power threshold, transmitting at a second bit rate responsive to the transmit power exceeding the alarm-power threshold, and transmitting at a third bit rate responsive to the transmit power being less than a lower-power threshold for a predetermined time period; and a network serving the mobile station wherein the first bit rate and the second bit rate belong to the same transport format combination set.

11. The method of claim 10 further comprising the step of setting the lower-power threshold at a same value within a given transport format combination set.

12. The method of claim 11 wherein the lower-power threshold of the mobile station is set based on the second bit rate and the third bit rate.

13. The method of claim 11 wherein the lower-power threshold set by the mobile station at the third bit rate does not cause the transmit power of the mobile station to exceed the alarm-power threshold.

14. The method of claim 13 wherein the mobile station predicts the transmit power of the mobile station if the mobile station were to transmit at the third bit rate.

15. A bit-rate adaptation system comprising;

a mobile station transmitting at a first bit rate until a transmit power of the mobile station exceeds an alarm-power threshold, transmitting at a second bit rate responsive to the transmit power exceeding the alarm-power threshold, and transmitting at a third bit rate responsive to the transmit power being less than a lower-power threshold for a predetermined time period; and a network serving the mobile station wherein the second bit rate and the third bit rate belong to the same transport format combination set.

16. A bit-rate adaptation system comprising:

a mobile station transmitting at a first bit rate until a transmit power of the mobile station exceeds an alarm-power threshold, transmitting at a second bit rate responsive to the transmit power exceeding the alarm-power threshold, and transmitting at a third bit rate responsive to the transmit power being less than a lower-power threshold for a predetermined time period; and a network serving the mobile station wherein the lower-power threshold is configured by a network serving the mobile station.

17. A bit-rate adaptation system comprising:

a mobile station transmitting at a first bit rate until a transmit power of the mobile station exceeds an alarm-power threshold, transmitting at a second bit rate responsive to the transmit power exceeding the alarm-power threshold, and transmitting at a third bit rate responsive to the transmit power being less than a lower-power threshold for a predetermined time period; and a network serving the mobile station wherein the first bit rate exceeds the second bit rate.

18. The method of claim 17 wherein the third bit rate exceeds the second bit rate.

19. The method of claim 17 wherein the first bit rate and the third bit rate are identical.

20. A method of transmitting at various bit rates to improve coverage area of a cell, comprising the steps of:

transmitting by a mobile station at a first bit rate;

transmitting by the mobile station at a second bit rate responsive to a determination that a transmit power of the mobile station has exceeded an alarm-power threshold for a pre-determined time period;

estimating a transmit power corresponding to transmission by the mobile station at a third bit rate; and transmitting by the mobile station at the third bit rate responsive to a determination that the estimated transmit power would not exceed the alarm-power threshold.

21. The method of claim 20 wherein the first bit rate exceeds the second bit rate.

22. The method of claim 21 wherein the third bit rate exceeds the second bit rate.

23. The method of claim 22 wherein the first bit rate and the third bit rate are identical.

24. The method of claim 20 wherein the first bit rate and the second bit rate belong to the same transport format combination set.

25. The method of claim 20 wherein the second bit rate and the third bit rate belong to the same transport format combination set.

26. A bit-rate adaptation system comprising:
  a mobile station transmitting at a first bit rate until a transmit power of the mobile station exceeds an alarm-power threshold for a pre-determined time period, transmitting at a second bit rate responsive to the transmit power exceeding the alarm-power threshold for the pre-determined time period, and transmitting at a third bit rate responsive to a determination by the mobile station that a transmit power corresponding to the third bit rate would not exceed the alarm-power threshold; and
  a network serving the mobile station.

27. The method of claim 26 wherein the first bit rate exceeds the second bit rate.

28. The method of claim 27 wherein the third bit rate exceeds the second bit rate.

29. The method of claim 27 wherein the first bit rate and the third bit rate are identical.

30. The method of claim 26 wherein the first bit rate and the second bit rate belong to the same transport format combination set.

31. The method of claim 26 wherein the second bit rate and the third bit rate belong to the same transport format combination set.

* * * * *